(12) United States Patent
Theimer et al.

(10) Patent No.: US 7,039,629 B1
(45) Date of Patent: May 2, 2006

(54) METHOD FOR INPUTTING DATA INTO A SYSTEM

(75) Inventors: Wolfgang Theimer, Bochum (DE); Udo Gortz, Bochum (DE); Reza Serafat, Bochum (DE); Klaus Rateitscheck, Bochum (DE); Peter Buth, Bochum (DE); Frank Dufhues, Wattenscheid (DE); Thomas Druke, Bochum (DE); Amir Imam, Bochum (DE); Christian Steinert, Langeln (DE)

(73) Assignee: Nokia Mobile Phones, Ltd., Espoo (FI)

( * ) Notice: Subject to any disclaimer, the term of this patent is extended or adjusted under 35 U.S.C. 154(b) by 2 days.

(21) Appl. No.: 09/614,276

(22) Filed: Jul. 12, 2000

(30) Foreign Application Priority Data

Jul. 16, 1999 (DE) ................................ 199 33 524

(51) Int. Cl.
*G06F 17/30* (2006.01)
(52) U.S. Cl. ................ 707/3; 707/2; 707/8; 704/4; 704/5; 704/6; 704/7; 704/246; 704/251
(58) Field of Classification Search ........ 704/240–256, 704/233, 270–273, 1–10; 707/1–10, 100–104.1, 707/200–26
See application file for complete search history.

(56) References Cited

U.S. PATENT DOCUMENTS

| | | | | |
|---|---|---|---|---|
| 4,523,331 A * | 6/1985 | Asija | ..................... | 382/192 |
| 4,866,778 A | 9/1989 | Baker | ..................... | 381/43 |
| 5,231,670 A * | 7/1993 | Goldhor et al. | ............ | 704/275 |
| 5,454,063 A * | 9/1995 | Rossides | ..................... | 704/270 |
| 5,499,288 A * | 3/1996 | Hunt et al. | ................. | 704/272 |
| 5,572,423 A | 11/1996 | Church | ....................... | 715/533 |
| 5,638,425 A * | 6/1997 | Meador et al. | ............ | 704/231 |
| 5,649,153 A * | 7/1997 | McNutt et al. | ............ | 711/118 |
| 5,710,866 A * | 1/1998 | Alleva et al. | .............. | 704/256 |
| 5,737,489 A * | 4/1998 | Chou et al. | ................ | 704/256 |
| 5,842,163 A * | 11/1998 | Weintraub | .................. | 704/240 |
| 5,895,447 A | 4/1999 | Ittycheriah et al. | ........ | 704/231 |
| 6,070,139 A * | 5/2000 | Miyazawa et al. | ......... | 704/270 |
| 6,161,083 A * | 12/2000 | Franz et al. | ............... | 704/233 |
| 6,480,819 B1 * | 11/2002 | Boman et al. | ................ | 704/9 |

FOREIGN PATENT DOCUMENTS

| | | |
|---|---|---|
| DE | 69204045 T2 | 4/1996 |
| DE | 19717601 A1 | 10/1997 |
| EP | 0554 492 A1 | 8/1993 |
| EP | 0 865 014 A2 | 9/1998 |

OTHER PUBLICATIONS

"Fundamentals Of Speech Recognition", Rabiner et al., Prentice Hall PTR, Chapter 4, 1993.

* cited by examiner

*Primary Examiner*—Jean M. Corrielus
*Assistant Examiner*—Isaac M. Woo
(74) *Attorney, Agent, or Firm*—Perman & Green, LLP

(57) ABSTRACT

The invention relates to a method for inputting data into a system. In order to make it easier for users to input data, the invention provides that, in response to an input by a user, one or more terms which are as appropriate as possible for this input are determined as identified terms, that a confidence value is defined for each of these identified terms, and that the terms associated with an input are dealt with further, taking account of their confidence values.

11 Claims, 3 Drawing Sheets

METHOD FOR INPUTTING DATA INTO A SYSTEM

The invention relates to a method for inputting data into a system.

The increasing further development of information and communications technology has resulted in ever more information and communications systems whose operation and use mean that it is necessary to input not only individual terms or commands, but also complete data records. Systems requiring such complex data inputs include, for example, navigation systems, which guide the user from his original location to a destination point, traffic information systems, e-mail services or the like.

Since the input means available for inputting data into a system, for example into a navigation system installed in a vehicle, are generally limited to simple keypads with a small number of keys, for example with a block of twelve keys, turn-and-push controls, so-called soft keys, that is to say keys whose function is assigned to them depending on program execution, or the like, it is difficult and time-consuming to input complete data records.

For example, with a known navigation system, the postal address of the destination has to be input, together with the house number, road name and town or area name. A push-and-turn control is provided for this purpose, using which individual letters can be selected and input from a list of displayed letters. In order to make it easier for the user to make an input in this case, once one letter has been input, the only letters which are still displayed are those which sensibly complement the previous letter sequence in terms of a town or road name to be selected and stored in the navigation system database. In this case, as soon as the input letter sequence corresponds to only one possible town or road name, the rest of the letters are added automatically, so that the user can continue to input the next term, until the data required to define the destination point have been input.

Such an input dialogue between a navigation system and a user is, however, rather tedious.

Input dialogues based on voice input have also already been proposed in order to avoid the limitations of the input dialogue using the limited, tactile input means.

In such a dialogue, the navigation system is first of all activated by a voice command "navigation system". The system responds with an audible or visual report "system ready", and then uses the input request "please spell out the town name" to request the user to spell out the name of the desired town. The user then inputs the town name, for example "E-R-D-I-N-G" as a letter string. The system then reports back the identified town name "Erding" as a word or as a letter string, and asks the user to confirm that the input is correct. If the system returns the input incorrectly, and the user uses the voice command "no" to reject the identified input, the input dialogue reverts to inputting the town name, and requests the user to spell out the town name once again.

If the town name has been identified correctly, the same process is repeated to input the road name, and then to input the house number.

Although such a voice input process is not subject to the limitations of input means such as keypads or turn-and-push controls, the strict dialogue structure means that there is a lack of simple correction facilities. Furthermore, the voice reports from the system, which always remain the same, are annoying and time-consuming for a practised user.

Against this background, the invention is based on the object of providing a method for inputting data into a system, which simplifies the inputting process, in particular voice inputs for data into the system, and thus simplifies and speeds up use of the system.

This object is achieved by the method according to claim 1.

Thus, according to the invention, in response to an input by a user, the system determines one or more terms, which are as appropriate as possible for this input, as identified terms, defines a confidence value for each of these identified terms, and deals with or processes the terms associated with an input further, taking account of their confidence values. The confidence value is in this case advantageously a value from an interval between a number, preferably 1, corresponding to reliable identification, and that for an input which cannot be identified, corresponding to 0, including these values.

The confidence values in this case describe the extent to which the identified term matches the input. The process of establishing the confidence value is generally known from the prior art and can be read, for example, in the book "Fundamentals of Speech Recognition", L. Rabiner, B-H Juang, 1993, Prentice Hall PTR, 1993, Englewood Cliffs, Chapter 4.

Once a term has been input by voice, either as a word or as a character string, not only an individual term is thus present, but a series of terms associated with the input are defined, which can then be dealt with further as a function of the confidence values, that is to say they can be displayed or announced, for example.

In a first refinement of the invention, the identified terms are announced and/or displayed to a user as a system response, starting with the term identified as being the most reliable, on the basis of their confidence values. This allows the user to select the correct term from the identified terms.

Thus, in response to his input, the user does not just receive a single identified term, but is offered the option, if the first-mentioned term is incorrect, to look for the correct term from the other identified terms. Thus, the input need be repeated only if none of the identified terms matches the user's intended input.

If the input into a system is used for selection of a data record, comprising a number of terms or data items, from a number of data records stored in the system, then one advantageous development of the invention provides that, for each identified term, those data records which are appropriate for the identified terms are looked for in a list of stored data records.

When terms or data are being input using a form-based dialogue structure, it is in this case particularly advantageous for the input to be completed by a data record appropriate for the identified term. Thus, for example, when inputting the destination point into a navigation system, if an address were to be input which is already stored in a personal address book, then a name associated with this address is, for example, input first of all, and the appropriate data record, that is to say the address, corresponding to the identified name, is then looked for, and the form is completed using the details from the data record.

In this case, the dialogue form may be completed automatically as soon as only one data record matches the input terms following the process of inputting one or more terms, for example "Müller", "Hamburg". However, according to the invention, it is preferable for the data input to be completed in response to a request signal. Another expedient refinement of the invention provides that the number of data records found can be reduced by inputting one or more further terms.

A particularly advantageous refinement of the invention is distinguished in that each stored data record is assigned a probability value, which describes the probability of the data record being used again. This probability value for a data record corresponds to the ratio of the number of times this data record has been used to the total number of times all the data records have been used.

In the situation where the system identifies a number of terms in response to an input, with each of which one or more data records are associated, the invention furthermore provides that an announcement/display sequence of the data records is defined as a function of their probability values and the confidence values of the associated terms.

Thus, for example, if a number of stored data records match an identified term, then that data record whose probability value is the highest is displayed first of all. This allows a user of a navigation system who has stored a number of addresses under the name "Müller" to select the address of that Mr/Mrs Müller who he visits most frequently, simply by inputting the term "Müller" when inputting into the navigation system the destination point desired at that time. If the user wishes to enter as the destination point another address stored as a data record under the term "Müller" then he then either just has to scroll through the determined data records, or he can enter a further term, which specifies the data record for the desired address more accurately, in advance.

The identified terms or the data records found are in this case expediently announced and/or displayed individually and successively, or as a selection list for confirmation or selection.

When using voice input, it is particularly advantageous for the confidence value of voice recognition to be established in the normal manner.

In order to improve the voice recognition confidence when using voice input, another development of the invention provides that the voice input by a user is first of all subjected to speaker identification, and that the subsequent voice recognition process is carried out taking account of the result of the speaker identification.

Another refinement of the invention provides that the input is made via an alphanumeric input device, with the terms entered in this way first of all being assigned the confidence value for reliable identification.

However, since different inputs or typing errors can occur frequently, for example with rotary digit or letter selectors or the like, without the user making the input actually identifying them when inputting alphanumeric terms via a keypad or some other tactile input means, it is particularly expedient for an incorrectly alphanumerically input term, which has already frequently been input incorrectly in a manner specific to a particular user, is assigned a lower confidence value as a function of input-specific error statistics. Furthermore, it is expedient if an incorrectly alphanumerically input term which has already frequently been input incorrectly in a manner specific to a particular user, is automatically corrected in this manner, with the corrected term being assigned a confidence value which is lower than the confidence value for reliable identification.

Another refinement of the invention provides for the input to be an image input.

The invention will be explained in more detail in the following text using the drawing by way of example, in which.

Figure 1:
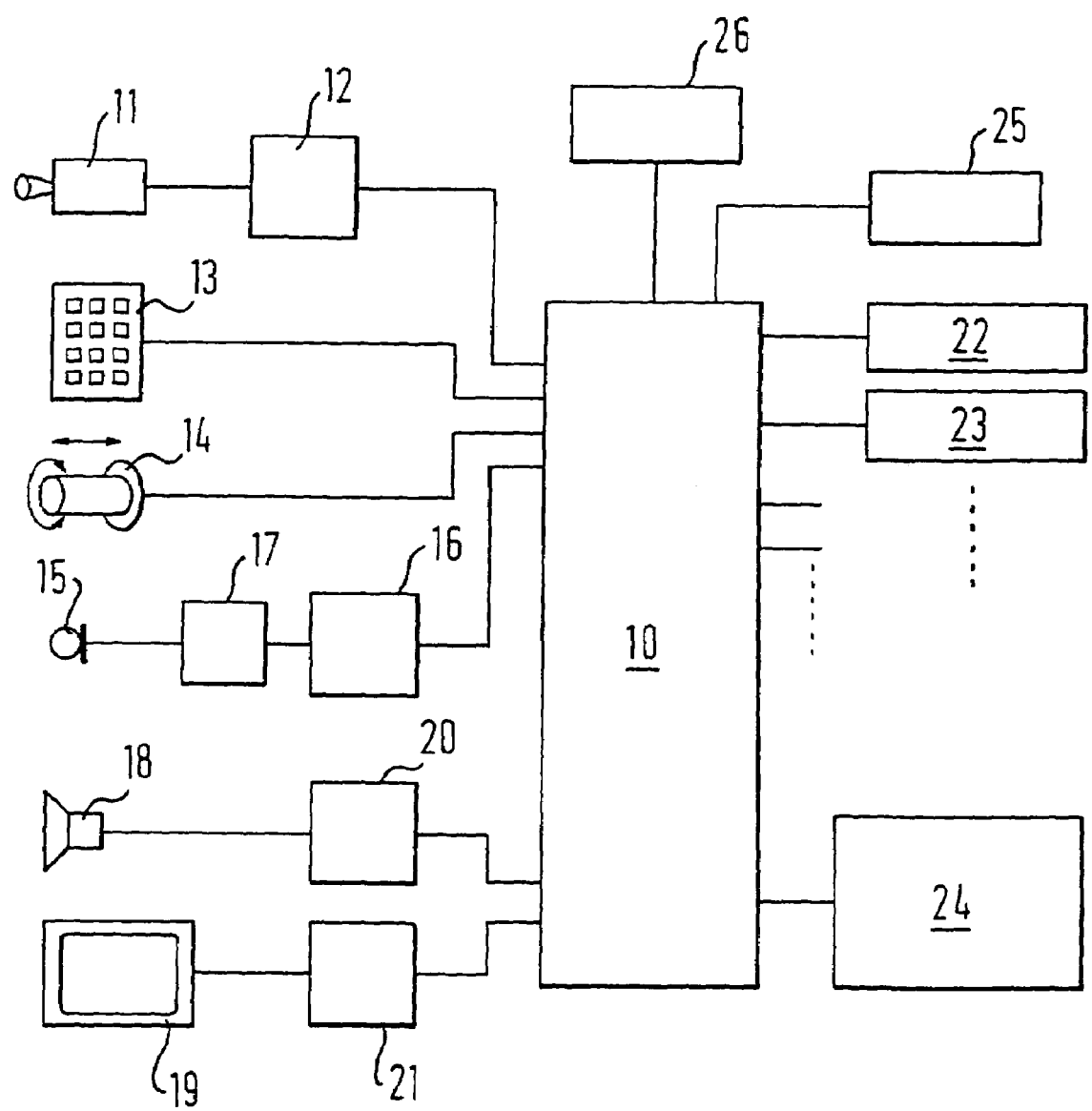
FIG. 1 shows a schematic block diagram of a user interface for carrying out the method according to the invention, with various connected applications.

As is shown schematically in FIG. 1, a processing circuit 10 of a user interface has connected to it, as input means, a video camera 11 having a downstream image recognition device 12, a keypad 13 which may be, for example, a block of twelve keys, a turn-and-push control 14 and a microphone 15 with associated voice recognition 16. In this case, in order to improve the voice recognition confidence, a speaker identification device 17 is in this case advantageously connected between the microphone 15 and the voice recognition 16 and assigns a speaker signal to the voice signal supplied from the microphone 15, using which the voice signal can be processed in the voice recognition device 16, taking account of the specific speaker characteristics.

A loudspeaker 18 is connected to the processing circuit 10 as output means, and a monitor 19 is connected as visual display means via a driver 20 for audible signals or a driver 21 for visual signals.

Furthermore, the processing circuit 10 is connected to applications 22, 23 which may be, for example, a navigation system, a road information system, an e-mail service, a fax service, a mobile radio service or the like. Each application 22, 23 may in this case be provided with its own database for data records to be used in the application. The various databases may in this case be stored either in an application-specific memory, or, as in the case of the illustrated user interface, in an appropriate data memory 24. It is particularly expedient to provide a database whose data records can be used by a number of applications. For example, apart from someone's name and telephone number, the data records in such a database may also have his postal address, his house number, road, town or area, and the corresponding GPS data. Such a data record could also include statistical data, for example indicating how frequently the corresponding person has been called, or how frequently this data record has been used for route planning to the place where that person lives.

In addition, it is also possible for application-specific statistical data to be stored in a memory area 25 for application-statistical data containing, for example, the absolute and relative usage frequency for each data record. Furthermore, a memory area 26 can be provided in which user-specific input errors and their frequency are stored.

Here, for example, it is possible to store specific typing errors, for example number inversions and their frequency, that is to say to store the fact that "89" is frequently input instead of "98" when making an input via the keypad 13 or the turn-and-push control 14. If statistical analysis in this case identifies that an input "89" is changed to "98" with a relative probability of, for example, 65%, then such a correction can be made automatically, with a confidence value of 0.65 at the same time being assigned to the term "98" which has been changed in this way. On the other hand, if the change frequency value is less than 50%, for example 45%, this value can be left unchanged and assigned a confidence value of, for example, 0.55.

Figure 2:
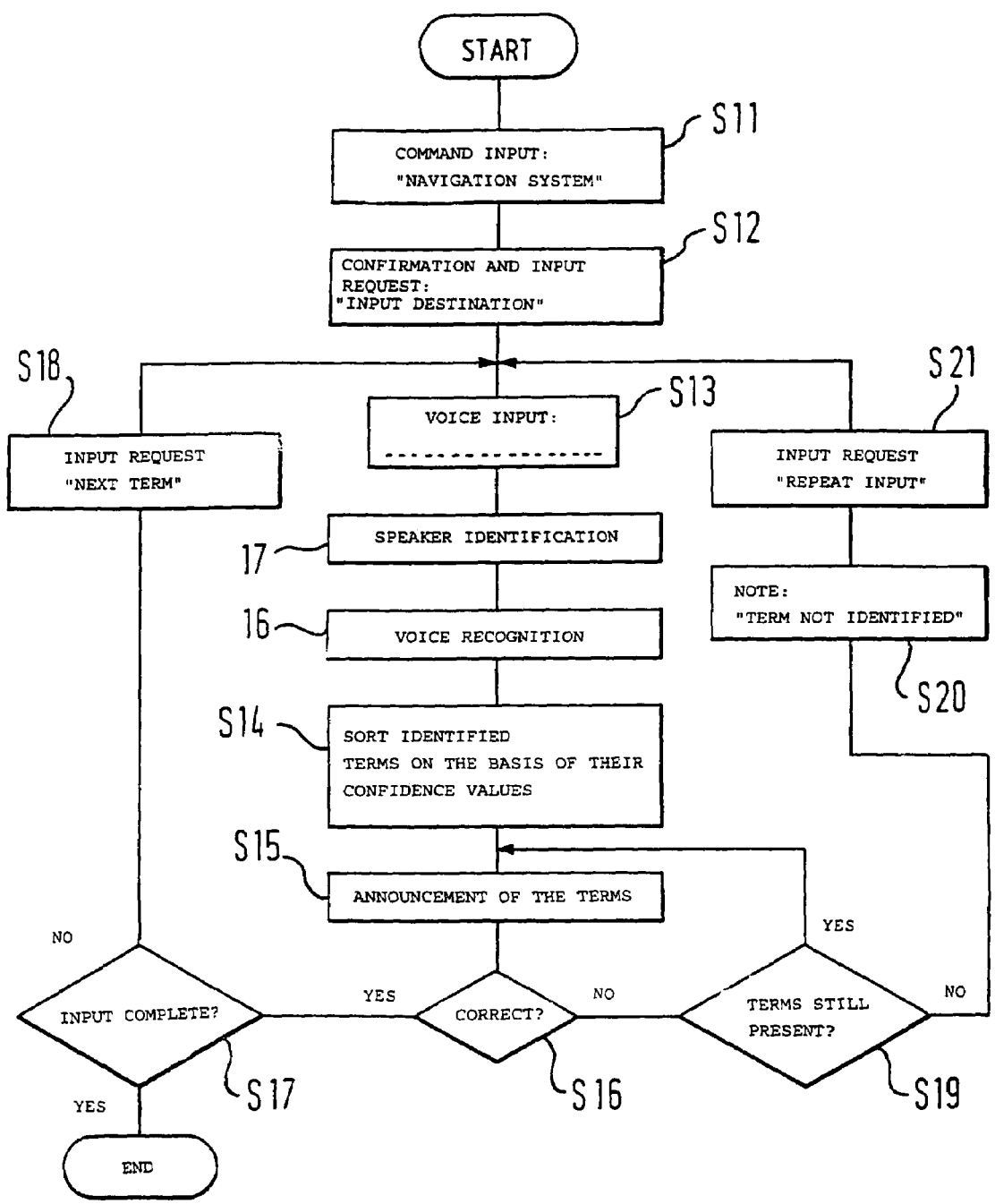
FIG. 2 shows a schematic, simplified flowchart of a first refinement of the method according to the invention.

A first exemplary embodiment of the method according to the invention for inputting data into a system will be explained in more detail in the following text using FIG. 2 by way of example. In this case, a navigation system will be described as a system. However, the method according to the invention can also be used successfully with other systems in which individual terms or a number of terms have to be input in order to select data records stored in a database or to produce data records to be stored in the database.

If, for example, a user who has access to a route plan and destination routing system or a navigation system wishes to access this navigation system, then, after switching the system on, he inputs the command "navigation system" (step S11). Depending on the respective actual equipment in a user interface, this input may be made in various ways. Only voice input will be described in the following text here. However, the fundamental structure of the method is not dependent on the nature of the input.

As soon as the navigation system is ready after inputting the command in step S11, it issues the input request "input destination" to the user, in step S12, as confirmation. The output in this case may either be announced or else displayed. An announcement and display may in this case also be produced simultaneously. The following text refers only to an announcement, although this does not preclude the alternative or supplementary display of an output.

Once the user has been requested to input the destination for the route plan that he would like to have produced, he makes the voice input in step S13. In this case, the name of the destination, for example "Erding" can be input as the letter sequence "E-R-D-I-N-G" or as the spoken word "ERDING". The acoustic signal received by the microphone 15 during the voice input in step S13 is first of all supplied as a voice signal to a speaker identification device 17, and then to voice recognition 16. The voice recognition in this case takes account of the result of the speaker identification to determine, in a known manner, the terms identified on the basis of the input. For example, from the input "ERDING", the voice recognition identifies the terms "Erding" with a confidence value of, for example, 0.8, "Erting" with a confidence value of 0.7, and "Ärding" with a confidence value of 0.6. In step S14, the identified terms are then sorted on the basis of their confidence values. Then, in step S15, the terms are announced in the sequence of their confidence values. The term identified to have the highest confidence value, that is to say "Erding" with a value of 0.8 here, is in this case the first to be announced or displayed. In step S16, the system uses, for example, the input request "is 'Erding' correct" to request confirmation or rejection of the identified term.

If the term is correct and has been confirmed by an appropriate voice input by the user, a dialogue is carried out in step S17 to determine whether the input is complete, that is to say whether all the terms to be input have been input, or whether there are any further terms to be input. In the latter case, the user is requested by the input request "next term" in step S18 to continue with the voice input (step S13).

However, if the input is complete, then the complete input is sent to the navigation system, and the input dialogue is terminated.

If the term announced in step S15 is not the term desired by the user, then, following the confirmation request in step S16, he rejects this term by "no", after which a check is carried out in step S19 to determine whether any further terms have been identified. If this is the case, then the next term is announced in step S15.

This procedure is repeated until either an identified term has been confirmed as being appropriate by the user, or all the terms have been rejected. Instead of successive announcements of the identified terms, if a display is used, all the terms can also be displayed in the form of a selection list. The user can then scroll through the list and select the desired term directly, or can reject the entire list as being incorrect.

If, once all the terms have been announced, all have been rejected as being incorrect, then the method jumps after step S19 to step S20, in which the note "term not identified" was output. The input request "repeat input" is then announced in order to inform the user that the system has returned once again for voice input in step S13.

In a manner which will not be described in any more detail, the user has the option after each input request to input a terminate command either as a voice command or via an appropriate terminate key. Pushing the turn-and-push control 14 may in this case be interpreted, for example, as a terminate command.

Not only destination inputs for a navigation system may advantageously be carried out in the described manner, but also the selection of specific data records from stored data records.

The simplest example of this is a personal telephone directory, which is stored electronically. However complex data records may also be selected in order, for example, to simplify the process of inputting destinations in a navigation system.

Figure 3:
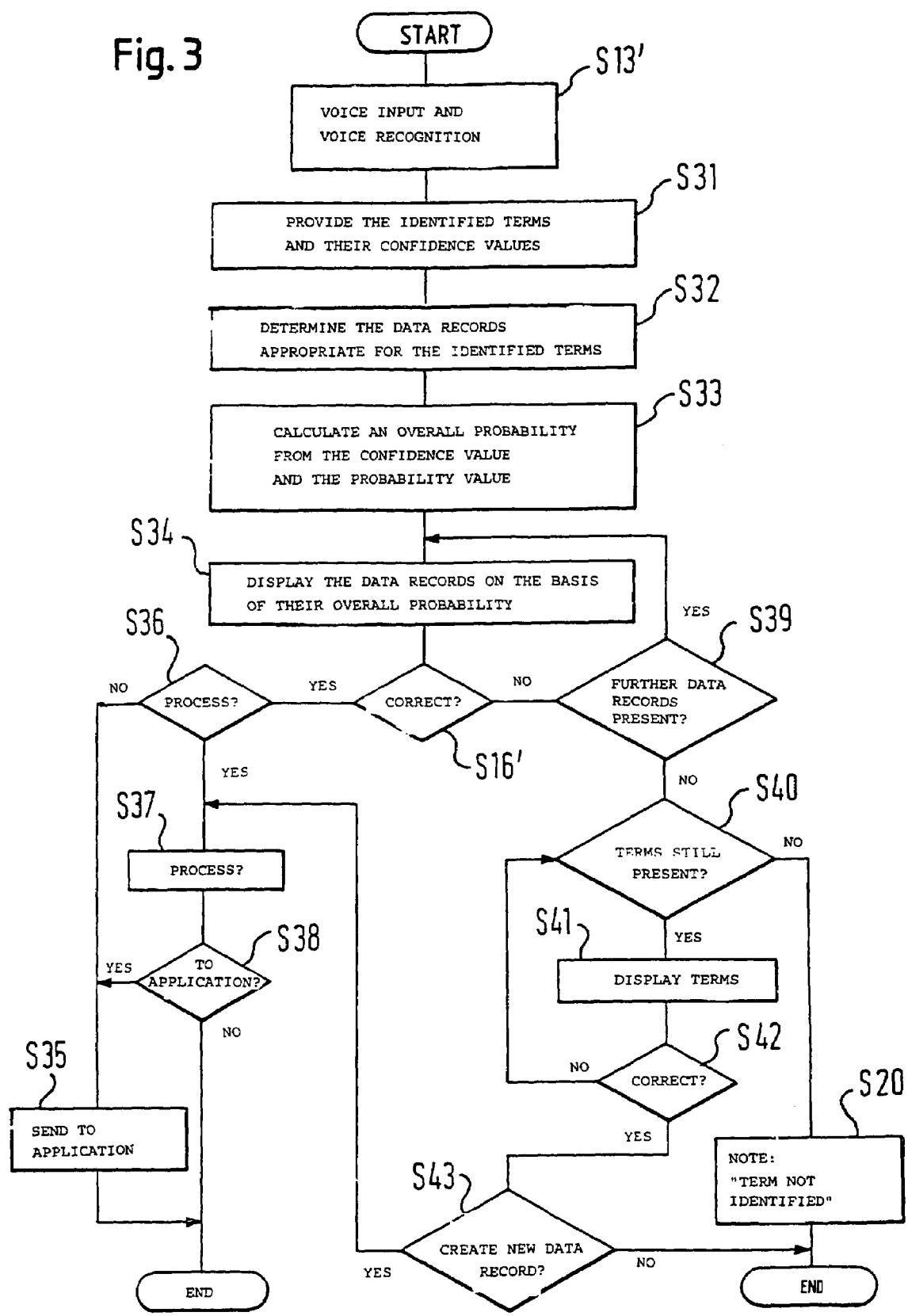
FIG. 3 shows a schematic, simplified flowchart of a second exemplary embodiment of the method according to the invention.

Such a method according to the invention, in which one data record can be selected from a large number of stored data records, in order to fill out a dialogue form of an application, that is to say for example the input requests "house number", "road" and "town or area" when inputting a destination into a navigation system, will be explained in the following text with reference to FIG. 3. After activation of the application (see steps S11 and S12 in FIG. 2), the voice input and voice recognition are carried out in step S13'. The terms identified on the basis of the input are then provided, together with their confidence values, in step S31 so that, in step S32, the data records which match the identified terms can be determined from the database, in step S32. Then, in step S33, an overall probability is calculated from the confidence value of the identified term and the probability value of the matching data record.

Thus, once a user has used predetermined voice commands, which have been identified without any problems by the voice recognition, to enter the destination under the name "Müller", in order to select for the destination input the data record associated with Mr/Mrs Müller, the voice recognition identifies the term "Möller" with a confidence value of 0.9 and, at the same time, the term "Müller" with a confidence value of 0.8, and the term "Mahler" with a confidence value of 0.5. Thus, in step S31, these identified terms are provided together with their confidence values for the process of determining the data records that match this, in step S32. In this case, for example, it is first of all found that there is no Mahler in the data records. However, data records do exist for the names "Müller" and "Möller", and it is known from the application-specific statistical data that both data records have been used for route planning in the past and that, in the last month, for example, a route to Mr/Mrs Möller has been calculated in 10% of all the route plans, and a route Mr/Mrs Müller has been calculated in 20% of all the route plans.

These frequency values are associated with the data records so that the overall probability can be calculated in step S33. The confidence value of the identified term is multiplied by the relative usage frequency of the respective data record for the overall probability, which indicates which of the determined data records shall be requested, and with what probability. In the illustrated example, the overall probability of the data record associated with Mr/Mrs Möller is 0.09, since the confidence value 0.9 is multiplied by a usage frequency value of 0.1 (10%). In a corresponding manner, the confidence value 0.8 and the usage frequency value 0.2 (20%) are used to calculate an overall probability of 0.16 for the data record associated with Mr/Mrs Müller.

On the basis of the higher calculated overall probability that the user would like to obtain a route plan to Mr/Mrs Müller, the data record of Mr/Mrs Müller is first of all used as the destination address in step S34, in which the data records are displayed organized on the basis of their overall probability. Once the user has identified in step S16' that the displayed data record is that desired for Mr/Mrs Müller, this is confirmed by a voice command or via a confirmation key. On the basis of the confirmation, the data record can be transferred directly to the application, that is to say the navigation system, as the destination for route planning (step S35). However, as is shown in FIG. 3, the system can once again be asked in advance, in step S36, whether the data record should be processed. If this is the case, then the data record is processed in step S37. Otherwise, the method returns to step S35. After completion of the processing, it is then possible to carry out an additional check in step S38 to determine whether the processed data record should be sent to the navigation system or should merely be stored.

However, if the data record associated with Mr/Mrs Möller does not include the desired destination address, then the method jumps in step S16' to step S39, in which a check is carried out to determine whether there are any other data records. If this is the case in the present example here, then the data record for Mr/Mrs Möller is displayed in step S34. If this data record is not the desired one either, then a check is once again carried out in step S39 to determine whether there are any other data records. If this is not the case, then a check is carried out in step S40 to determine whether there are still any terms which have been identified and for which it has not been possible to find any data records. If this is the case, as in the example, that term is displayed in step S41. Once, in step S42, the user has confirmed the displayed term as that which he desired, the system asks, in step S43, whether a new data record should be used. If this is the case, then the method continues to step S37, otherwise, the input method is ended.

If, in step S42, the user rejects the displayed term as being incorrect, then the method returns to step S40 until there are no more identified terms. In this case, corresponding to step S20, a note is then issued which indicates that the term has not been identified, in order that the input method can then be ended.

However, after step S20 and after step S43, it is also possible to return to the voice input in step S13', and to request the user to make another input.

When a data record is selected, in order to reduce a list of data records which has been found after inputting a term, it is also possible in accordance with the method explained with reference to FIG. 3 to input a further term, and to look for this term only in the list which has already been obtained. If, for example, the name Müller has been correctly identified and a number of data records have been associated with the name Müller, then the desired one of these data records can be determined by an additional input, as explained above.

With the method according to the invention, it is also possible to make the selection of data records from a database on the basis of one or more terms which have been input, and to complete an input form or an input dialogue like a form only when the user inputs an appropriate request signal acoustically, visually or by touch via the keypad 13 or the turn control 14. This allows the user to input two or more terms from the start, in order to simplify the search for the desired data record and the automatic completion of the input.

Instead of the described pure voice input, it is also possible to make a combined voice and keypad input. In this case, the confidence value 1 for key input can be reduced by the system if it is known on the basis of the input-specific error statistics, which are stored in the memory area 26, that the input has a certain amount of uncertainty associated with it on the basis that typing errors and/or numerical inversions by the user have frequently be identified. In this case, as has already been explained above, it is also possible to correct inversions of numbers or letters, and other typing errors, if required.

Using the video camera 11 and the downstream image identification 12, it is possible to input individual commands as well as individual letters by using gestures or the like. For example, an open hand could be defined as a command to terminate an operation. Quantitative values can also be recorded by the start and end of a hand movement, with the values determined in each case likewise being associated with a confidence value.

The method according to the invention and described with reference to FIG. 3 thus makes it possible to carry out even complex dialogues quickly and reliably since the dialogues and dialogue forms are automatically completed on the basis of already stored data records, which are selected on the basis of the specified terms, so that the user need not continually input data once again after they have already been input.

The invention claimed is:

1. A method for inputting data into a system comprising the steps of:
    in response to a voice input by a user, identifying one or more terms, which are as appropriate as possible for the voice input based on a confidence value;
    determining from stored data records, data records matching the identified terms as well as probability values assigned to the matching data records, wherein each of said probability values is calculated for each stored data record as a ratio of the number of times the matching data record has been used during a certain period of time in the immediate recent past to the total number of times all the stored data records have been used during the certain period so as to describe the relative probability of the matching data record being used again;
    calculating an overall probability from said confidence value of the identified term and the probability value of the matching data record;
    processing said identified terms according to said overall probability; and
    wherein the voice input is first of all subjected to speaker identification, and the subsequent voice recognition process is carried out, taking into account the result of the speaker identification.

2. Method according to claim 1, characterized in that the confidence value is a value from an interval between a number, preferably 1, corresponding to reliable identification, and that for an input which cannot be identified, corresponding to 0, including these values.

3. Method according to claim 1, characterized in that, the identified terms are announced and/or displayed to a user as a system response, starting with the term identified as being the most reliable, on the basis of the overall probability.

4. Method according to claim 1, characterized in that, for each identified term, the data records which are appropriate for the identified terms are looked for in a list of stored data records.

5. Method according to claim 4, characterized in that, when data are being input, the input is completed by a data record appropriate for the identified term, using a form-based dialogue structure.

6. Method according to claim 5, characterized in that the data input is completed in response to a request signal.

7. Method according to claim 5, characterized in that the number of data records found can be reduced by inputting one or more further terms.

8. Method according to claim 1, characterized in that an announcement/display sequence of the data records is defined as a function of their overall probability.

9. Method according to claim 1, characterized in that, an incorrectly alphanumerically input term, which has already frequently been input incorrectly in a manner specific to a particular user, is assigned a lower confidence value as a function of input-specific error statistics.

10. Method according to claim 1, characterized in that the input is an image input.

11. A method for inputting data into a system comprising the steps of:

in response to an input by a user, made via an alphanumeric input device, the input being assigned a confidence value for reliable identification, and identifying one or more terms, the terms being as appropriate as possible for the input based on the confidence value;

determining from stored data records, data records matching the identified terms as well as probability values assigned thereto, wherein each of said probability values is calculated for each stored data record as a ratio of the number of times the matching data record has been used during a certain period of time in the immediate recent past to the total number of times all the stored data records have been used during the certain period so as to describe the relative probability of the matching data record being used again;

calculating an overall probability from said confidence value of the identified term and the probability value of the matching data record;

processing said identified terms according to said overall probability; and wherein an incorrect, alphanumerically input term, which has already frequently been input incorrectly in a manner specific to a particular user, is automatically corrected, with the corrected term being assigned a confidence value which is lower than the confidence value for reliable identification.

* * * * *